(12) United States Patent
Bevan et al.

(10) Patent No.: US 10,549,753 B2
(45) Date of Patent: Feb. 4, 2020

(54) ENGINE CONTROL METHOD AND ENGINE CONTROLLER

(71) Applicant: Trident Torque Multiplication Technologies Limited, Swaffham (GB)

(72) Inventors: Phillip Bevan, Swaffham (GB); Daniel Monagham, Swaffham (GB)

(73) Assignee: Trident Torque Multiplication Technologies Limited, Swaffam, Norfolk (GB)

( * ) Notice: Subject to any disclaimer, the term of this patent is extended or adjusted under 35 U.S.C. 154(b) by 0 days.

(21) Appl. No.: 15/124,772

(22) PCT Filed: Mar. 10, 2015

(86) PCT No.: PCT/GB2015/050700
§ 371 (c)(1),
(2) Date: Oct. 26, 2016

(87) PCT Pub. No.: WO2015/136271
PCT Pub. Date: Sep. 17, 2015

(65) Prior Publication Data
US 2017/0080937 A1    Mar. 23, 2017

(30) Foreign Application Priority Data
Mar. 20, 2014   (GB) .................................. 1404211.3

(51) Int. Cl.
*B60W 30/14*    (2006.01)
*F02D 41/04*    (2006.01)
(Continued)

(52) U.S. Cl.
CPC .......... *B60W 30/146* (2013.01); *B60W 10/06* (2013.01); *B60W 10/115* (2013.01);
(Continued)

(58) Field of Classification Search
CPC .. B60W 30/146; B60W 10/06; B60W 10/115; B60W 2710/0622;
(Continued)

(56) References Cited

U.S. PATENT DOCUMENTS 4,964,318 A    10/1990 Ganoung
5,468,195 A *  11/1995 Kashiwabara ........ B60W 10/06
                                                477/46

(Continued)

FOREIGN PATENT DOCUMENTS

EP    0 272 814 A2    6/1888

*Primary Examiner* — Joseph J Dallo
*Assistant Examiner* — Kurt Philip Liethen
(74) *Attorney, Agent, or Firm* — Woodard Emhardt Henry Reeves & Wagner LLP

(57) ABSTRACT

An engine management apparatus for a vehicle having a fuel ratio controller arranged to control the air to fuel ratio of a fuel mixture for the vehicle's engine, a power demand sensor arranged to sense power demands made of the engine, and an engine controller configured to increase the air to fuel ratio from a first selected value to a second selected value in the event that the rate of vehicle speed change is less than a first threshold and the demand is less than a second threshold.

16 Claims, 2 Drawing Sheets

(51) Int. Cl.
*F02D 41/14* (2006.01)
*B60W 10/06* (2006.01)
*B60W 10/115* (2012.01)
*F02D 41/26* (2006.01)
*F16H 63/50* (2006.01)

(52) U.S. Cl.
CPC ....... *F02D 41/045* (2013.01); *F02D 41/1454* (2013.01); *F02D 41/1486* (2013.01); *F02D 41/26* (2013.01); *F16H 63/50* (2013.01); *B60W 2510/0619* (2013.01); *B60W 2510/1005* (2013.01); *B60W 2540/10* (2013.01); *B60W 2710/0622* (2013.01); *B60W 2710/0644* (2013.01); *B60W 2710/1005* (2013.01)

(58) Field of Classification Search
CPC . B60W 2710/0644; B60W 2510/0619; B60W 2710/1005; F02D 41/26; F02D 41/023; F02D 41/1486; F02D 41/1454; F02D 41/045; F16H 63/50
See application file for complete search history.

(56) References Cited

U.S. PATENT DOCUMENTS

| | | | |
|---|---|---|---|
| 5,483,939 A | | 1/1996 | Kamura et al. |
| 5,787,380 A | * | 7/1998 | Cullen ................ F02D 41/0002 123/308 |
| 5,925,088 A | * | 7/1999 | Nasu ................... F02D 41/1456 123/491 |
| 9,091,219 B2 | * | 7/2015 | Kar ....................... F02D 11/105 |
| 2011/0021312 A1 | * | 1/2011 | Fukitani .................. B60K 6/48 477/5 |
| 2012/0310456 A1 | * | 12/2012 | Mischler ............. F02D 41/0007 701/22 |
| 2015/0119192 A1 | * | 4/2015 | Otanez ................. B60W 10/02 477/5 |
| 2015/0184599 A1 | * | 7/2015 | Yokota ................. B60W 10/06 123/402 |

* cited by examiner

ENGINE CONTROL METHOD AND ENGINE CONTROLLER

BACKGROUND

The present disclosure relates to the control of engines, and more particularly to methods for reducing the fuel consumption of engines, and in particular compression ignition engines.

Torque multiplication may be used in torque converters, such as those used in automatic gear boxes to increase the acceleration in performance vehicles by altering gear ratios. Such techniques generally sacrifice fuel economy to provide better acceleration. The present disclosure is concerned with torque control to increase fuel efficiency.

On all 4 stroke engines, every other stroke is a power stroke where fuel is burned. This burning of fuel produces CO2 and NOx emissions in dependence upon the rate at which fuel is burned. This rate in turn depends on the engine speed—as an engine performs a greater number of more revolutions per minute it also tends to produce emissions at a greater rate.

It has therefore traditionally been believed that high performance vehicles are less fuel efficient and produce more unwanted emissions than other types of vehicles.

SUMMARY

Aspects and examples of the present disclosure aim to improve both fuel economy and vehicle performance, and are defined in the appended claims.

BRIEF DESCRIPTION OF THE DRAWINGS

Particular non-limiting embodiments of the disclosure are now explained, by way of example only, with reference to the accompanying drawings, in which.

In the drawings like reference numerals are used to indicate like elements.

DETAILED DESCRIPTION

Figure 1:
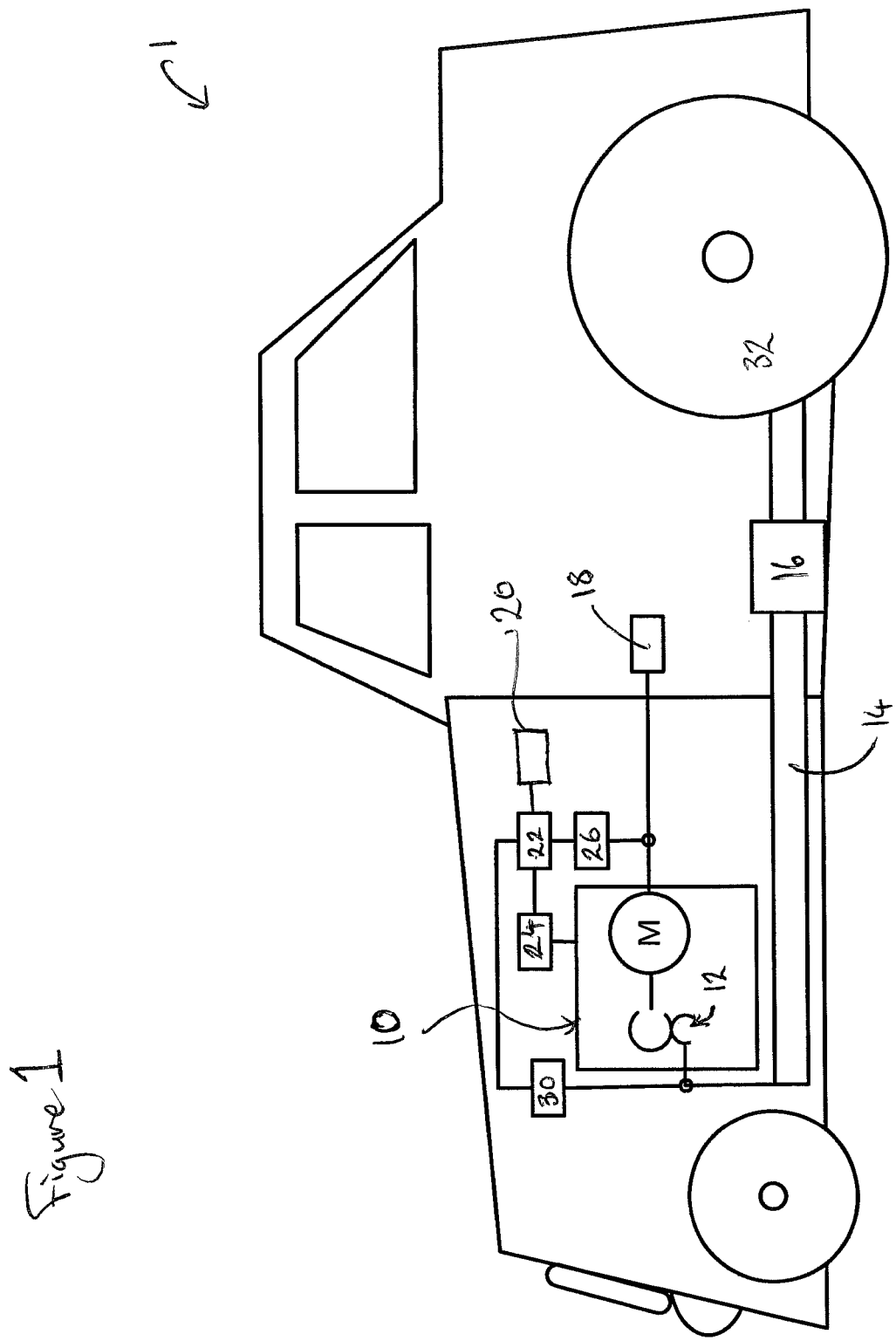
FIG. 1 shows an example of a vehicle comprising an engine management apparatus according to the present disclosure.

With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

FIG. 1 shows a schematic illustration of a vehicle 1 comprising an engine 10 having a gearbox 12, and a drive train 14.

The present disclosure will be principally explained with reference to FIG. 1, and relates to methods and apparatus for managing engine performance of a vehicle. Such embodiments are directed to reducing engine speed, and/or increasing the air to fuel ratio ("leaning off") the engine whilst maintaining road speed. These methods and apparatus are mostly, but not exclusively, directed towards the control of compression ignition engines.

The inventors in the present case have appreciated that compression ignition engines may be configured to have an optimum efficiency range of between 1800 and 2800 rpm, and that they may also have an air to fuel ratio selected to provide optimum efficiency in this range of engine speeds.

As a consequence such engines may be over-fuelled (the air to fuel ratio being too low) at low revs, but under-fuelled, or running weak, above their selected optimum range. This may be associated with the ability of fuel injection pumps to keep up with the engine speed at high revs. Petrol engines have a broader engine revolution range of operation than diesels, making the maximum efficiency range greater, but similar challenges may occur.

Embodiments of the disclosure provide an apparatus comprising a controller configured to increase the air to fuel ratio between selected values in the event that it detects that the vehicle speed is approximately constant and the engine load is low.

For example, the vehicle speed can be deemed approximately constant if the acceleration is less than a first threshold level.

For example, the engine load may be deemed low if the load on the engine is less than a second threshold.

In response to detecting these conditions, the air to fuel ratio can be changed from a first selected value (e.g. associated with operating the vehicle under engine load conditions), to a second selected value (e.g. associated with "leaning off" the fuel mixture under light engine load).

For example, this first selected value of the air to fuel ratio may be in the range of about 14:1 to about 16:1, with the engine speed in the range of 1600 RPM to 2800 RPM. It will be appreciated however that different ranges of engine speed may be appropriate for different engines. The second selected value may be much leaner air to fuel ratio, for example a ratio in the range of about 50:1 or 60:1 or even higher. Other ranges of fuel ratios are envisioned where the first selected value is between 10 and 20, between 12 and 18, or between 15 and 17, and where the second selected value is greater than 30, greater than 40, greater than 50, or, in another example, about 60.

Once a vehicle has finished accelerating, the torque demand may be reduced because there is less need to accelerate the vehicle mass. The vehicle may then start to cruise, or be driven on a light throttle. In some embodiments of the disclosure the air fuel ratio may therefore be increased (e.g. as described above) in response to identifying that the vehicle has ended a period of acceleration. For example, the vehicle may be controlled in this way after identifying that it has been accelerating for a first period of time, and then been driven at constant speed for a second period of time.

Whilst applying this control to reduce the engine and increase the air to fuel ratio, the engine controller may be configured to increase the gear ratio of the vehicles' drive train to maintain the vehicle's speed. The change in gear ratio and/or the reduction in engine speed and/or the change in air to fuel ratio may be selected so as to maintain constant vehicle speed.

In response to detecting that the driver has changed the throttle setting, or applied the brakes, the air to fuel ratio maybe returned to its initial value (e.g. from the second selected value, back to the first selected value). This may be done in response to sensing an increase in the power demand made of the engine, for example in response to the operator of the vehicle opening the throttle to climb a hill or to increase vehicle speed.

FIG. 1 illustrates one example of this disclosure. As noted above, the vehicle 1 illustrated in FIG. 1 comprises an engine 10 having a gearbox 12, and a drive train 14. The vehicle also comprises an engine management apparatus comprising a fuel ratio controller 24, a power demand sensor 26, a vehicle speed determiner 30, and a controller 22.

A user interface 18, such as an accelerator pedal, is coupled to provide a power demand signal to the engine 10. The engine 10 is coupled by the gearbox 12, and the drive train 14 to a wheel 32 of the vehicle. The apparatus illustrated in FIG. 1 may also comprise a gear ratio controller 20, and an optional second gearbox 16. The vehicle speed determiner 30 is coupled to the drive train 14 of the vehicle, and to the controller 22.

The power demand sensor 26 is coupled to sense a user torque demand communicated to the engine 10 from the user interface 18 (e.g. a signal provided by accelerator pedal position). The power demand sensor 26 may also be coupled to sense the engine speed. The power demand sensor 26 is configured to store an association between this torque demand and engine speed, and is configured to determine the power demand based on this association, the torque demand signal, and the engine speed.

The fuel ratio controller 24 is coupled to the engine 10, and arranged to be controlled by the controller 22. The fuel ratio controller 24 is operable to control the air to fuel ratio of a fuel mixture for the vehicle's engine 10. In examples where the engine 10 comprises a common rail compression ignition engine, the fuel ratio controller 24 may be configured to control operation of an injector coupling a cylinder of the engine 10 to the common rail. In these examples, the fuel ratio controller 24 may be configured to modulate the frequency and duration of injections of fuel and/or air into the cylinder so as to modify the air to fuel ratio. In one example these injections may be controlled by piezoelectric elements arranged to actuate fuel injectors which couple a fuel supply to an engine cylinder (e.g. an injector which couples a common rail fuel supply to a cylinder of a compression ignition engine). These piezoelectric elements may comprise piezoelectric crystal flakes, and may be configured to allow fine adjustments in pulses and spray width patterns. Other electromechanical actuators may also be used.

The vehicle speed determiner 30 may be coupled to a sensor for sensing a speed of rotation of the vehicle's drive train 14, and may be configured to infer the speed of the vehicle from this sensed signal. For example the sensor may be coupled to the vehicle's transmission, or to a wheel 32 or axle. In some examples a vehicle speed measurement may be derived from a CANBUS message obtained from a CANBUS of the vehicle, or directly from its ECU.

The controller 22 may be configured to obtain a vehicle speed signal from the vehicle speed determiner 30, and to obtain an engine power demand signal from the power demand sensor 26. The controller 22 may be further configured to identify when the vehicle is being driven at an approximately constant speed under low engine load. To identify when the vehicle is being driven at constant speed the controller 22 is configured to sense whether the rate of vehicle speed change is less than a first threshold. To identify when the engine load is low the controller 22 is configured to sense whether the power demand placed on the engine 10 is less than a second threshold.

The controller 22 may also be configured so that, in the event that the vehicle is being driven at an approximately constant speed under low engine load it controls the fuel ratio controller 24 to increase the air to fuel ratio from a first selected value to a second selected value. For example, to increase the air to fuel ratio from a range of between about 14 to 16 (the first selected value), to a ratio in the range of about 50 to about 60, for example 50 or more, for example 60 or more (the second selected value).

In operation, when the vehicle is being driven the controller 22 may obtain a power demand signal from the power demand sensor 26 to determine the power demand made of the engine 10. The controller 22 may also obtain a vehicle speed signal from the vehicle speed sensor, and continues to monitor the vehicle speed and engine load.

Whilst the vehicle is accelerating, and the engine load is relatively high, the controller 22 permits the fuel ratio controller 24 to provide an air fuel mixture having the first selected value (for example a ratio in a range from between about 14 to about 16). This may inhibit unwanted detonation of fuel in the cylinders.

Once the vehicle mass has finished accelerating, the controller 22 detects that the vehicle is cruising at constant speed, or is being driven on a light throttle (e.g. when the power demand made on the engine 10 drops). In response to detecting one or both of these conditions, the controller 22 weakens the air fuel mixture by increasing the air to fuel ratio from the first selected value to a second selected value, for example about 50 or more, or 60 or more. These conditions may be detected by detecting that the rate of change of vehicle speed is less than a first threshold and/or that the power demand made of the engine 10 is less than a second threshold. To maintain vehicle speed, the controller 22 may control the gear ratio controller 20 to increase the gear ratio in the drive train 14 of the vehicle. This may be accomplished by controlling the second gearbox 16 and/or by controlling the user operated gearbox 12 of the engine 10.

Figure 2:
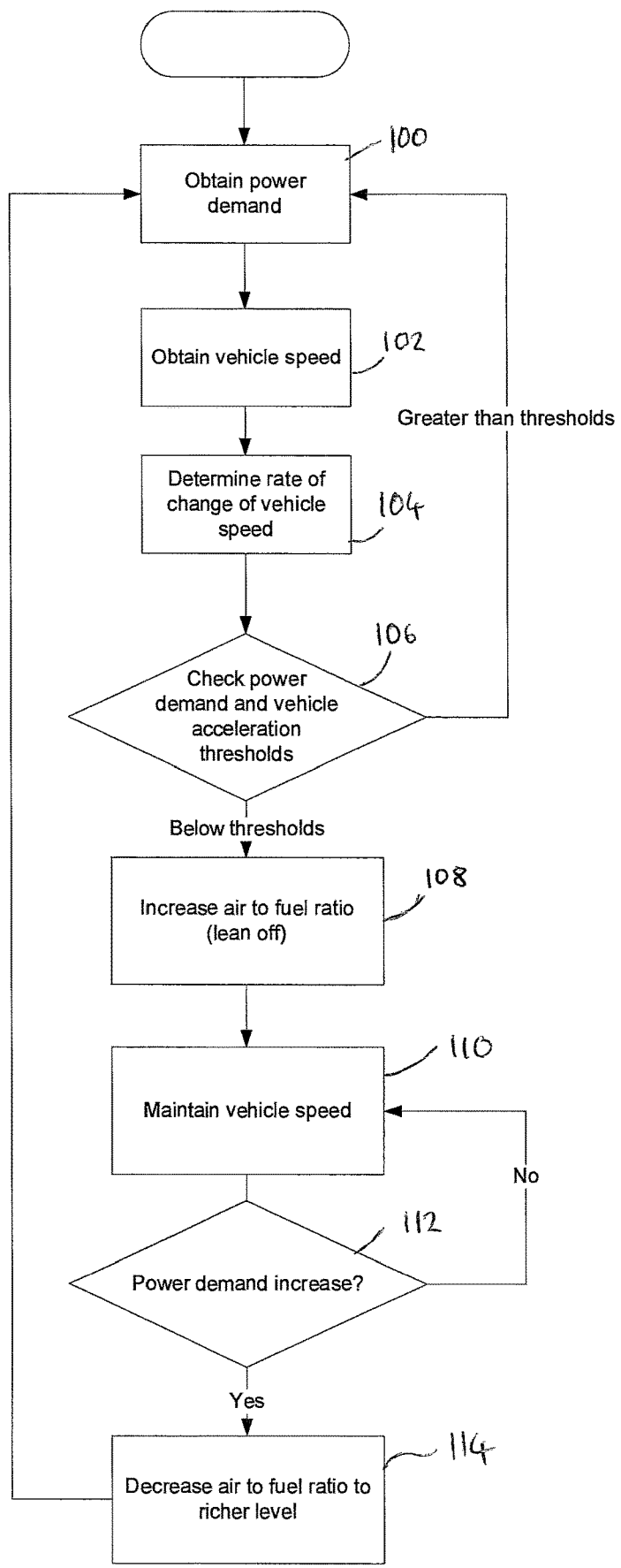
FIG. 2 comprises a flow chart illustrating a method of controlling operation of a vehicle engine according to the present disclosure.

FIG. 2 illustrates a method of controlling an engine 10 of a vehicle. The method comprises obtaining 100 a power demand signal indicating the load placed on the engine 10, and obtaining 102 a vehicle speed signal indicating the speed of travel of the vehicle. The rate of change of vehicle speed (e.g. the acceleration) is then determined 104, and the power demand and rate of change of vehicle speed are checked 106 to see whether either (or both) of these parameters are less than a threshold level. If they are greater than the threshold, the engine 10 is deemed to be under load and/or the vehicle is deemed to be accelerating, and so the power demand and speed continue to be monitored.

In the event that the rate of change of vehicle speed and/or power demand are less than the respective thresholds, the air to fuel ratio is increased 108 form a first selected level (for example a ratio in a range from between about 14 to about 16) to a second selected level (for example to a ratio of about 50 or more, or about 60 or more). The engine 10 is then controlled so that the speed of the vehicle is maintained 110, and the power demands placed on the engine 10 are monitored. Vehicle speed may be maintained by increasing the gear ratio of the vehicle's drive train, either by using an optional secondary gearbox 16, or by controlling the user operated gearbox 12.

In the event that the power demand is detected to increase 112 (for example when the driver demands more torque by pressing an accelerator pedal), the air to fuel ratio is returned 114 from the leaner, second, level, back to the richer first level. In addition the gear ratio of the vehicle's drive train may be returned to the previous, lower level (e.g. the level that it was at before it was modified at step 110, described above) either by using the optional secondary gearbox 16, or by controlling the user operated gearbox 12.

Embodiments of the disclosure provide a controller 22 that can be retrofitted to an existing engine 10, for example by being coupled to its engine control unit (ECU). This and other controllers described herein may be configured to modify the air to fuel ratio in a first engine speed range, for example in the range between 980 rpm and 1400 rpm, to permit the revert back to a standard air to fuel ratio (e.g. an air to fuel ratio specified by an engine manufacturer and/or demanded by an existing ECU) in a second engine speed range (e.g. between 1600 rpm and 2800 rpm) and also to modify the air to fuel ratio in a third air to fuel ratio in a third engine speed range (e.g. from 2800 rpm to 4500 rpm).

The air to fuel ratio in each of these engine speed ranges may be selected to increase fuel efficiency whilst inhibiting detonation (for example inhibiting spontaneous combustion of unburnt fuel remaining in a cylinder after a power stroke and/or inhibiting premature combustion of fuel prior to the power stroke).

In some embodiments, the disclosure provides a secondary gear assembly, such as the optional second gearbox 16 illustrated in FIG. 1 that is operable to modify the gear ratio of a drive train 14 of a vehicle, and which may for example be coupled into the drive train 14 between a user controlled gearbox 12 and a wheel 32 to be driven by the engine, for example between the user controlled gearbox 12 and a differential of the vehicle, for example a rear differential. This secondary gear assembly may comprise a planetary gear arrangement. In these examples the user operated gearbox 12 may comprise a standard gearbox.

In some embodiments, the controller is configured to control the air to fuel ratio in the event that the vehicle speed is greater than a minimum speed threshold, for example 20 mph, for example 25 mph, for example 30 mph. The controller may also be configured to control the air to fuel ratio based on at least one of user torque demand signal, (e.g. accelerator pedal position APP), vehicle wheel speed, engine input speed, Turbo boost pressure, the gear selected/commanded signal, Turbo vane position (for example obtained from Turbo vane solenoid position signal), particularly in the case of Variable Vane Turbo's (VVT) which change vane pitch dependant on engine load. For example one or more combinations of ranges of these parameters may be used to trigger a change in the air to fuel ratio. For example, the controller may be configured to increase the air to fuel ratio in the event that the gear ratio of the vehicle's drive train is not changed for a selected time period. This may be done on the condition that controller senses that the vehicle speed is greater than a selected threshold speed (e.g. based on a signal from the vehicle speed determiner). In some embodiments this may be done on the condition that a user torque demand signal (e.g. from accelerator pedal position) is stable, for example changing by less than a selected threshold change, for example less than a selected relative threshold change (e.g. a percentage signal change).

The controller may also be configured to determine whether signals obtained from a turbo boost and/or input/output differential relating to the gear ration of the drive train are within a selected range and to determine whether to increase air to fuel ratio on this basis. The controller may be configured to store a look up table relating user torque demand and turbo boost signal values to a selected air to fuel ratio, and to select an air to fuel ratio based on this table and a received user torque demand and turbo boost signal value. As another example, the controller may be configured to control air to fuel ratio based on the user torque demand (e.g. from accelerator pedal position) and the gear ratio selected by the vehicle's user. In some cases engine speed and user torque demand may be used to determine whether to control the air to fuel ratio. In some cases the gear ratio may be selected based on these parameters without changing the air to fuel ratio. In some configurations the controller is configured to store a plurality of look-up tables, each relating two or more of these parameters to an air to fuel ratio and/or to a modifying a gear ratio of the vehicle's drive train—for example by controlling a secondary gearbox as explained above.

The power demand sensor may be configured to determine engine load based on one or a combination of parameters. For example, the power demand sensor may be configured to determine the engine load based on user torque demand signal (e.g. accelerator pedal position), injection frequency, turbo activation, vane speed and/or engine speed. For example the power demand sensor and/or the controller may store a look-up table relating user torque demand signal (e.g. accelerator pedal position) and engine speed to an engine load. For example selected ranges of user torque demand and engine speed may be related by such tables to an indication of engine load—for example relating to an indication of low engine load.

In some examples the turbo vane position and/or vane pitch may also be used in this way. For example the power demand sensor and/or the controller may store a look-up table relating turbo vane position, and user torque demand signal (e.g. accelerator pedal position) and engine speed to an engine load.

The controller may be configured to obtain an indication of engine load, determined in one of these ways, from the power demand sensor and to determine whether to increase the air to fuel ratio based on this engine load being less than a selected threshold (e.g. the second selected threshold mentioned above).

In some examples the power demand sensor may be configured to determine power demands made of an engine (engine load) based on one or more of: Boost, Turbo vane position, APP, Engine rpm, Intake Air Temp (IAT) with Mass Air Flow (MAF) sensor signals (e.g. a combined sensor measurement of air temperature/density/flow rate), oil pressure, Engine and Transmission torque demand. One or more of these parameters may be obtained from messages transmitted on a vehicle's CANBUS.

In addition, or as an alternative to, increasing air to fuel ratio based on engine load and constant vehicle speed, the controller may be configured to air to fuel ratio based on one or more parameters selected from the list comprising: cylinder and exhaust gas temperature combined with pressure, Glow plug activation from Glow Plug Control Module (GPCM) data, with fuel rail return values (less fuel being used, more fuel returned to tank via return line). One or more of these parameters may be obtained from messages transmitted on a vehicle's CANBUS.

The vehicle speed sensor may be configured to sense vehicle speed based on a hall sensor coupled to sense the speed of rotation of one or more components (e.g. a gear) of the vehicle's drive train, for example on the output drive shaft or from the output gearbox sensor. A signal from this sensor may be provided to the vehicle's ECU and/or to the controller, and may be modified to take account of differential ratio adjustments.

In some embodiments air to fuel ratio can be controlled by controlling the frequency and/or duration of fuel injection into an engine cylinder. Optimum fuel ratio can be controlled by cylinder temperature through the GPCM. As will be appreciated, by controlling this temperature the density of the air in the air fuel mixture in the cylinder can also be controlled—thereby controlling air to fuel ratio in the combustion chamber. Fuel flow pressure regulation can also control fuel delivery to the injector allowing change of percentage of fuel per stroke.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In an embodiment the engine management apparatus for a vehicle, the apparatus comprising: a fuel ratio controller arranged to control the air to fuel ratio of a fuel mixture for the vehicle's engine; a power demand sensor arranged to sense power demands made of the engine; a vehicle speed determiner; and a controller configured to increase the air to fuel ratio from a first selected value to a second selected value in the event that the rate of vehicle speed change is less than a first threshold and the demand is less than a second threshold.

The controller may be configured to reduce the air fuel ratio only in the event that the vehicle speed determiner and the power demand sensor identify a reduction in power demand associated with a vehicle ending an acceleration phase.

The engine management apparatus may comprise a gear ratio controller operable to change the gear ratio of a drive train of the vehicle, wherein the controller is configured so that reducing the air to fuel ratio from the first selected value to the second selected value further comprises increasing the gear ratio of a drive train of the vehicle and reducing the engine speed.

The controller may be further configured to return the air to fuel ratio from the second selected value, to the first selected value in response to an increase in the power demand made of the engine.

The gear ratio controller may comprise at least one of: a gear box controller, and a gear controller for controlling a planetary gear assembly.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The controllers and other electronic logic herein may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

What is claimed is:

1. An engine management apparatus for a vehicle, the apparatus comprising:
    a fuel ratio controller arranged to control the air to fuel ratio of a fuel mixture for the vehicle's engine;
    a power demand sensor arranged to sense power demands made of the engine;
    a vehicle speed determiner;
    a gear ratio controller operable to change the gear ratio of a drive train of the vehicle; and
    an engine controller configured to increase the air to fuel ratio from a first selected value to a second selected value in the event that the rate of vehicle speed change is less than a first threshold and the demand is less than a second threshold;
    whilst applying this control of air to fuel ratio, to reduce engine speed and to operate the gear ratio controller to change gear ratio, wherein the change in gear ratio and reduction in engine speed are selected to maintain vehicle speed.

2. The engine management controller of claim 1, wherein the engine controller is further configured to return the air to fuel ratio from the second selected value, to the first selected value in response to an increase in the power demand made of the engine.

3. The apparatus of claim 1 wherein the gear ratio controller comprises at least one of: a gear box controller, and a gear controller for controlling a planetary gear assembly to ensure the drive train always remains in gear.

4. The engine management apparatus of claim 1 wherein the first selected value of the air fuel ratio is in the range between 10 and 20.

5. The engine management apparatus of claim 1 wherein the second selected value of the air fuel ratio is greater than 30.

6. A method of controlling an engine, the engine having an efficiency range comprising a range of engine speeds appropriate for the engine, the method comprising:
    obtaining a power demand signal based on the power demand made of the engine;
    obtaining a vehicle speed signal indicating the speed of the vehicle;
    in response to the rate of change of vehicle speed being less than a first threshold and the power demand being less than a second threshold, increasing the air to fuel ratio from a first selected value to a second selected value, wherein the first and second selected values are chosen to increase fuel efficiency of the engine and/or inhibit unwanted detonation of fuel within the engine;
    increasing a gear ratio of a drive train of the vehicle and reducing the engine speed during the period that the air to fuel ratio is increased from the first selected value to the second selected value; and
    maintaining vehicle speed, whilst applying this control of air to fuel ratio, by reducing engine speed and changing gear ratio, wherein the change in gear ratio and reduction in engine speed are selected to maintain vehicle speed and promote operation of the engine within the efficiency range.

7. The method of claim 6 wherein the rate of change of vehicle speed being less than the first threshold and the power demand being less than the second threshold is associated with one of:
    (i) a cruise condition; and
    (ii) a trailing throttle condition.

8. The method of claim 6 comprising increasing the air to fuel ratio only in the event that the vehicle speed determiner and the power demand sensor identify a reduction in power demand associated with a vehicle ending an acceleration phase.

9. The method of claim 6 comprising returning the air to fuel ratio from the second selected value, to the first selected value in response to an increase in the power demand made of the engine.

10. The method of claim 6 wherein the first selected value of the air fuel ratio is in the range between 12 and 18.

11. The method of claim 6 wherein the second selected value of the air fuel ratio is greater than 40.

12. A method of modifying a vehicle comprising,
coupling an apparatus to a vehicle's engine for controlling the engine, the apparatus comprising:
 a fuel ratio controller arranged to control the air to fuel ratio of a fuel mixture for the vehicle's engine;
 a power demand sensor arranged to sense power demands made of the engine;
 a vehicle speed determiner arranged to determine vehicle speed;
 an engine controller configured to increase the air to fuel ratio from a first selected value to a second selected value in the event that the rate of vehicle speed change is less than a first threshold and the demand is less than a second threshold; and,
 a gear ratio controller operable to control a planetary gear assembly;
introducing a planetary gear assembly into the vehicle's drivetrain, wherein the planetary gear assembly is provided by a secondary gear assembly coupled into the drive train of the vehicle between a user controlled gear box and a wheel to be driven by the engine and also wherein the apparatus is configured to control the planetary gear assembly to ensure the drive train always remains in gear; and
configuring the gear ratio controller so that when the air to fuel ratio is increased to the second selected value, the gear ratio controller operates the planetary gear assembly to change the gear ratio of a drive train of the vehicle to maintain vehicle speed.

13. A vehicle comprising an engine management apparatus according to claim 1.

14. A tangible non-transitory computer program product comprising program instructions configured to program an engine control unit of a vehicle to perform the method of claim 6.

15. The engine management controller of claim 4, wherein the gear ratio controller is operable to change the gear ratio of a secondary gear assembly coupled into the drive train of the vehicle between a user controlled gear box and a wheel to be driven by the engine.

16. The method of claim 6, wherein increasing the gear ratio of a drive train of the vehicle comprises increasing the gear ratio of a secondary gear assembly coupled into the drive train of the vehicle between a user controlled gear box and a wheel to be driven by the engine.

* * * * *

UNITED STATES PATENT AND TRADEMARK OFFICE
CERTIFICATE OF CORRECTION

| | | |
|---|---|---|
| PATENT NO. | : 10,549,753 B2 | Page 1 of 1 |
| APPLICATION NO. | : 15/124772 | |
| DATED | : February 4, 2020 | |
| INVENTOR(S) | : Phillip Bevan et al. | |

It is certified that error appears in the above-identified patent and that said Letters Patent is hereby corrected as shown below:

On the Title Page

Item (72) the second inventor's name is shown as Daniel Monagham. This should be corrected to --Monaghan--.

Item (30) In the Foreign Application Priority Data section, the priority date is incorrect. It should be corrected to --March 10, 2014--.

Signed and Sealed this
Second Day of June, 2020

Andrei Iancu
*Director of the United States Patent and Trademark Office*